United States Patent [19]

Lo

[11] Patent Number: 5,069,048
[45] Date of Patent: * Dec. 3, 1991

[54] AUTOMOBILE STEERING LOCK

[76] Inventor: Tsung I Lo, 5th Fl., No. 76, Ai-Kuo E. Road, Taipei, Taiwan

[*] Notice: The portion of the term of this patent subsequent to Apr. 9, 2008 has been disclaimed.

[21] Appl. No.: 643,943

[22] Filed: Jan. 22, 1991

Related U.S. Application Data

[63] Continuation-in-part of Ser. No. 505,425, Apr. 6, 1990, Pat. No. 5,005,388.

[51] Int. Cl.⁵ ............................................. B60R 25/02
[52] U.S. Cl. .......................................... 70/209; 70/226
[58] Field of Search ................. 70/209, 211, 212, 225, 70/226, 237, 238, 448

[56] References Cited

U.S. PATENT DOCUMENTS

| | | | |
|---|---|---|---|
| 1,448,658 | 3/1923 | Furber | 70/226 |
| 3,245,239 | 4/1966 | Zaidener | 70/237 |
| 4,738,127 | 4/1988 | Johnson | 70/209 |
| 4,887,443 | 12/1989 | Wang | 70/226 X |
| 5,005,388 | 4/1991 | Lo | 70/226 X |

FOREIGN PATENT DOCUMENTS

| | | | |
|---|---|---|---|
| 2705213 | 8/1977 | Fed. Rep. of Germany | 70/448 |
| 2718291 | 10/1978 | Fed. Rep. of Germany | 70/226 |
| 853984 | 12/1939 | France | 70/203 |
| 1127524 | 9/1968 | United Kingdom | 70/226 |

Primary Examiner—Lloyd A. Gall
Attorney, Agent, or Firm—Bacon & Thomas

[57] ABSTRACT

An antitheft device for attachment to a steering wheel of an automobile comprising an elongated body member having a passageway extending along an axis therein, a first hook secured to the body member for engagement with a poriton of the steering wheel, an elongated rod member adapted to move in telescopic fashion in the passageway of the body member along the axis, a second hook secured to the rod member for engaging the steering wheel diametrically opposed to the first hook, and a lock assembly including a housing made of mating halves and secured together by a bracket member and rivets to define plural passageways and internal chambers for accommodating a lock mechanism that allows the rod member to extend with respect to the body member and be selectively locked in any one of a plurality of positions.

3 Claims, 4 Drawing Sheets 5,069,048

AUTOMOBILE STEERING LOCK

CROSS REFERENCE TO RELATED APPLICATION

The present invention is a continuation in part of my U.S. patent application Ser. No. 505,425, filed Apr. 6, 1990, and now the Lo U.S. Pat. No. 5,005,388 allowed.

The present invention relates generally to an automobile antitheft device, and more particularly to an improved structure of a lock assembly of the automobile antitheft device.

BACKGROUND OF THE INVENTION

My U.S. Pat. No. 5,005,388 discloses an antitheft device for attachment to a steering wheel of an automobile. Said antitheft device includes an elongated body member having a passageway extending along an axis therein, a first hook secured to the body member for engagement with a portion of the steering wheel wherein the first hook engages the wheel from the inside thereof with the body member extending outward beyond the periphery of the steering wheel, an elongated rod member adapted to move in telescopic fashion in the passageway of the body member along the axis, a second hook secured to the rod member for engaging the inside portion of the steering wheel diametrically opposed to the first hook, and a lock assembly that allows the rod member to extend with respect to the body member and be selectively locked in any one of a plurality of positions.

A disadvantage of the aforementioned automobile antitheft device is that it is rather complicated in machining the housing of the lock assembly of the automobile antitheft device. Another disadvantage is that the housing of the automobile antitheft device presents plural entrances or pry points which are thus machined and restored with corresponding metallic discs or plates. The lock assembly of said automobile antitheft device so constructed is rather weak to be spoilt.

It is accordingly a primary object of the present invention to provide an improved casing for housing a lock mechanism of a lock assembly of an automobile steering lock to overcome the foregoing defects associated with prior art devices.

DETAILED DESCRIPTION OF A PREFERRED EMBODIMENT

Figure 1:
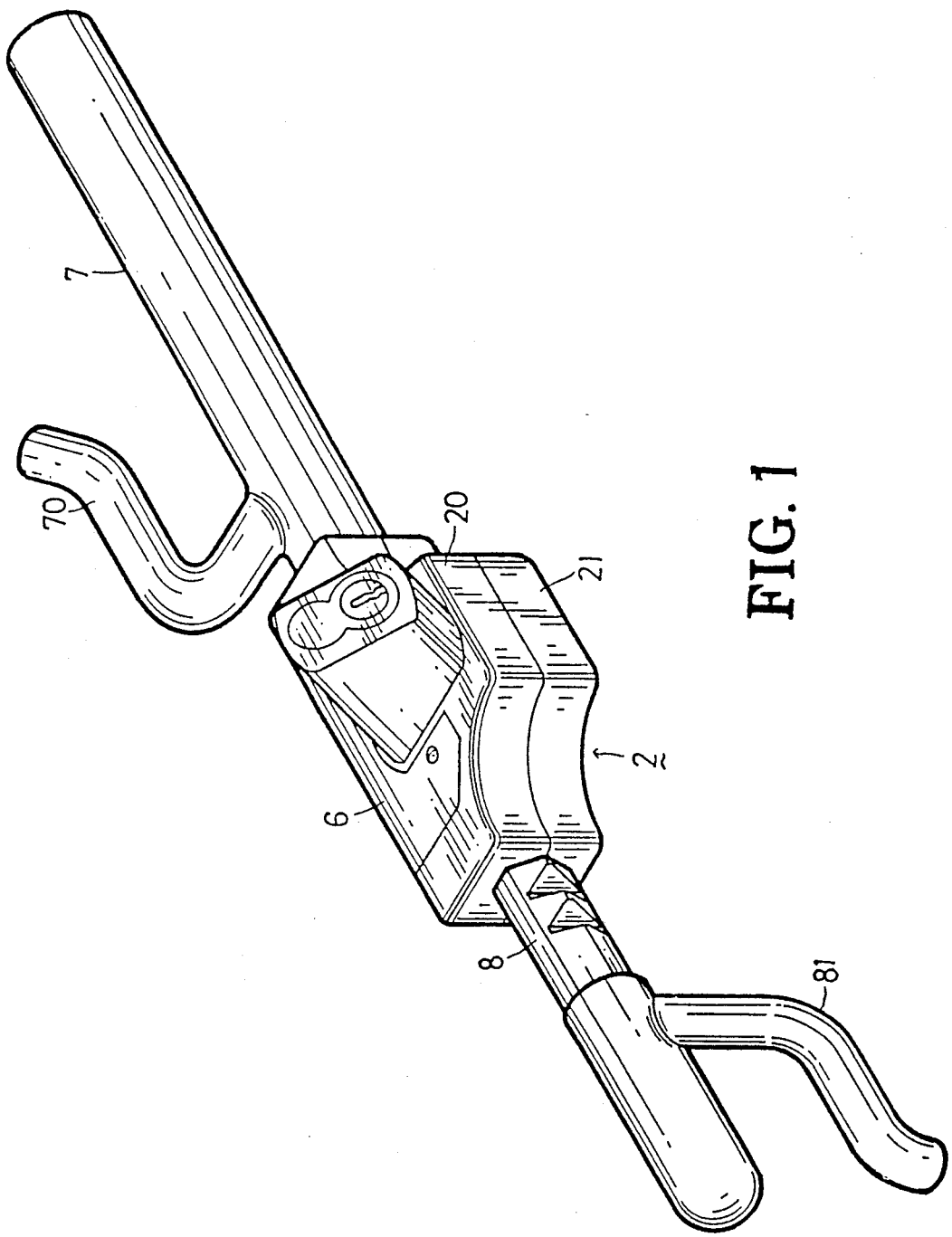
FIG. 1 is a perspective view of a preferred embodiment according to the present invention which is in an assembled condition.

Referring to FIG. 1, an automobile steering lock according to the present invention is identical in general to the one disclosed by my U.S. Pat. No. 5,005,388, and comprises an elongated body member 7, an elongated rod member 8 which is dimensioned to extend and retract in telescopic fashion within the body member 7, hooks 70, 81 for engaging opposed portions of a steering wheel from the inside thereof, and being respectively provided on the body member 7 and rod member 8, a housing 2 including upper and lower mating halves 20, 21 which are secured together by means of a bracket member 6 and a locking mechanism being provided within the housing 2 to selectively position and lock the rod member 8 stationary with respect to the body member 7 at any one of a plurality of positions.

Figure 2:
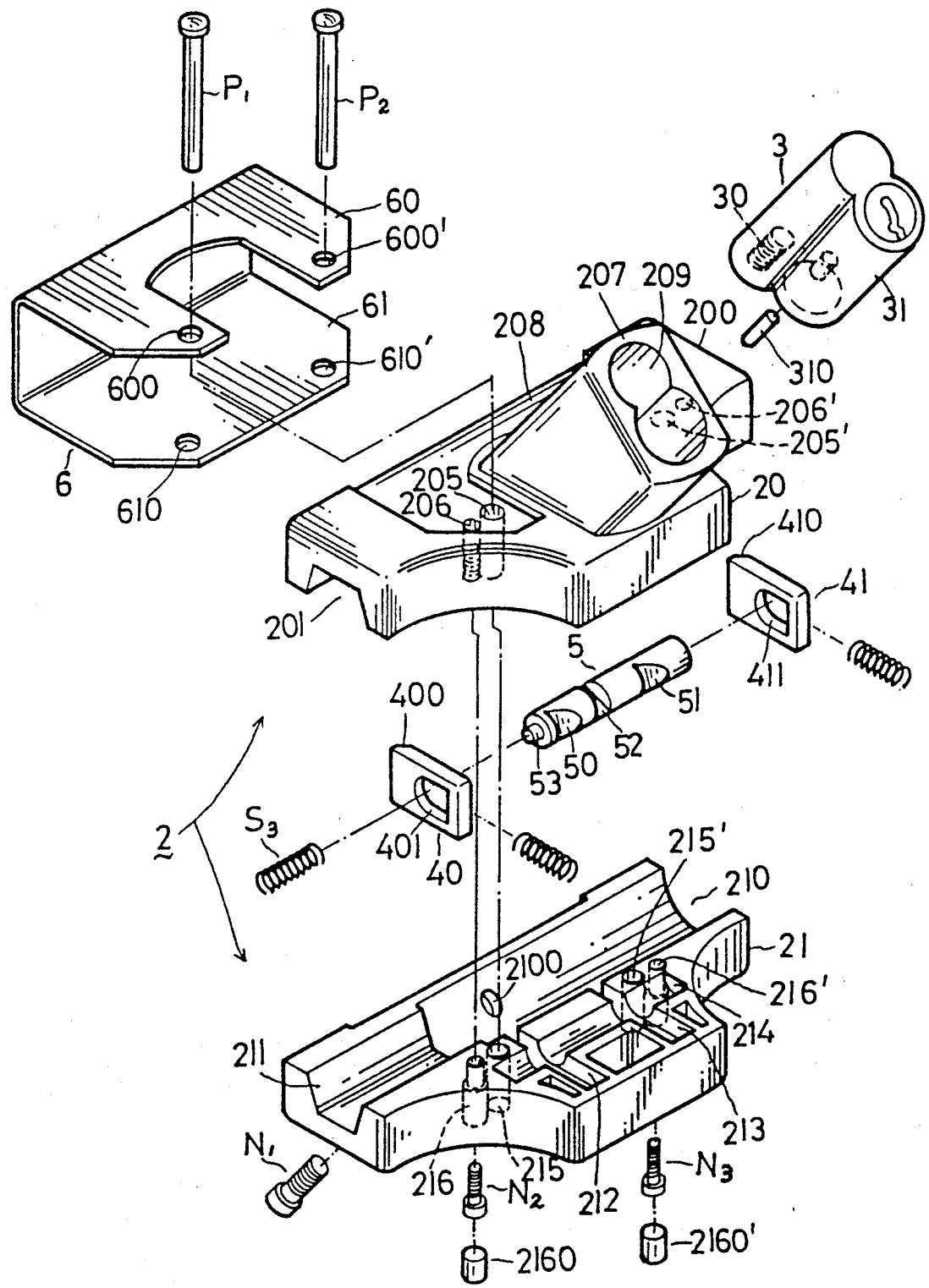
FIG. 2 is an exploded perspective view of a lock assembly of the preferred embodiment.

The present invention characterizes in the structure of the housing 2. Referring to FIG. 2, the housing 2 includes two mating halves 20, 21 which are secured together by means of said bracket member 6 and rivet pins P1, P2 to define plural passageways and internal chambers for accommodating the locking mechanism including a locking means 3, an actuating means 5 and a pair of locating members 40, 41.

The lower half 21 of the housing 2 comprises a molded or machined metallic body having a trough which extends longitudinally therethrough and is divided into a semi-circular rear section 210 and an isosceles trapezoidal front section 211, a semi-circular groove 214 extending parallel to the trough, a pair of transverse grooves 212, 213 extending across the semi-circular groove 214 and communicating the semi-circular rear section 210 of the trough, a screw hole 2100 communicating the semi-circular rear section 210 of the trough for receiving a screw N1 and two pairs of spaced holes 215, 216, 215', 216' extending vertically therethrough for respectively receiving screws N2, N3 and one end of the rivet pins P1, P2.

Figure 3:
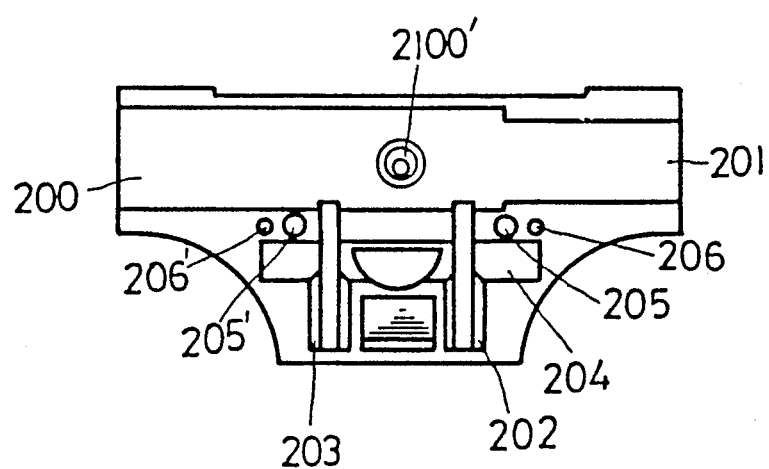
FIG. 3 is a top elevational view of an upper half of a housing of the lock assembly which is shown in FIG. 2, separated from a lower half and positioned in an upside-down condition.

The construction of the upper half 20 is identical to the lower half 21 except that the upper half 20 is further provided with a boss 207 for receiving the locking means 3. Referring to FIGS. 2 and 3, the upper half 20 of the housing 2 comprises a molded or machined metallic body having a trough which extends longitudinally therethrough and is divided into a semi-circular rear section 200 and an isosceles trapezoidal front section 201, a semi-circular groove 204 extending parallel to the trough, a pair of transverse grooves 202, 203 extending across the semi-circular groove 204 and communicating the semi-circular rear section 200 of the trough, a screw hole 2100' and two pairs of spaced holes 205, 206, 205', 206' respectively corresponding to the holes 2100, 215, 216, 215', 216' in the lower half 21 when the upper half 20 is mounted to mate the lower half 21, and a boss 207 integrally offset and slanted with respect to the longitudinal axis of the body member 7 and having a bore 209 extending therethrough for firmly receiving the locking means 3 and securing it in position by means of the screw N1 which extends through the corresponding screw holes 2100, 2100' and is tightly threaded into a screw hole 30 extended inwardly from a bottom of the locking means 3. The locking means 3 has a conventional key lock 31 and an actuating pin 310 eccentrically attached to the bottom of the conventional key lock 31.

Figure 4:
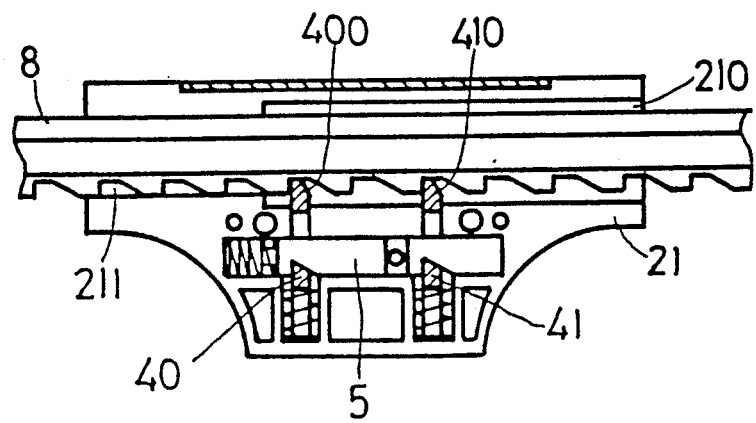
FIG. 4 is a top elevational view of the housing of the steering lock wherein the upper half of the housing is removed and the steering lock is in a locking condition.
Figure 5:
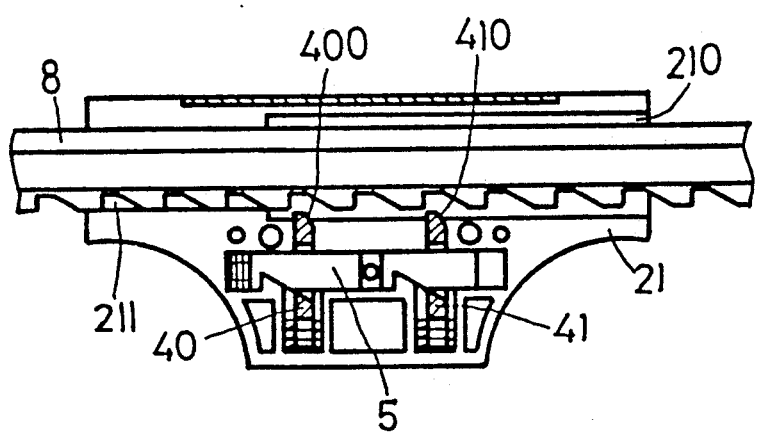
FIG. 5 is a top elevational view of the housing of the steering lock wherein the upper half of the housing is removed and the steering lock is in an unlocking condition.

The upper half 20 and the lower half 21 are disposed with the grooved sides thereof adjacent each other so as to define the following:

a) A central passageway defined by the corresponding troughs and including a circular rear section for receiving the open end of the body member 7 and a hexagonal front section for extending therethrough of the rod member 8 which is hexagonal in its cross-section;

b) A cylindrical compartment defined by the corresponding semi-circular grooves 204, 214 for slidably accommodating the rod-like actuating member 5 which has a projection 53 projecting frontwardly for receiving one end of a biasing spring S3, a recess 52 defined by two opposed stop side walls in its middle portion and two spaced notches 50, 51 each of which includes a vertical side wall and a convex or slope side wall;

c) A pair of transverse passageways defined by corresponding transverse grooves 202, 203, 212, 213 and extending across the cylindrical compartment and further intersecting the central passageway defined by the corresponding troughs for slidably accommodating tenon-like locating members 40, 41 which are normally biased towards the central passageway and formed with respective openings 401, 411 so dimensioned to allow extending through of the actuating member 5 and transversely locating the locating members 40, 41 between a first position where the front ends 400, 410 of the members 40, 41 protrude from the transverse passageways into the central passageway and engage two corresponding notches of the rod members 8 to lock the automobile antitheft device, as best shown in FIG. 4, and a second position where the front ends 400, 410 of the members 40, 41 disengage the notches of the rod member 8 and the front ends 400, 410 of the members 40, 41 are withdrawn into the transverse passageways to unlock the automobile antitheft device of the present invention, as best shown in FIG. 5.

The upper half 20 and the lower half 21 are secured together firstly by means of the screws N2, N3 which extend through the screw hole 216, 216' in the lower half 21 and tightly threaded into corresponding screw holes 206, 206' in the upper half 20 and then restored the screw holes 216, 216' with metallic discs 2160, 2160' after the assembly of the screws N2, N3. The upper half 20 and the lower half 21 thus secured are further secured by the bracket member 6 and rivet pins P1, P2. The bracket member 6 is an U-shaped member with two spaced side walls 60, 61 complementarily fitted in a recessed portion 208 in the upper half 20 and a recessed portion (not shown) in the lower half 21 to confine the mating halves 20, 21 which are further riveted together with the pins P1, P2 which extend through the rivet holes 600, 600', 610, 610' in the side walls 60, 61 of the bracket member 6 and rivet holes 205, 205', 215, 215' in the mating halves 20, 21.

The internal chambers such as the cylindrical compartment defined by the corresponding semi-circular grooves 204, 214 for accommodating the actuating member 5 and the transverse passageways defined by the transverse grooves 202, 212 and 203, 213 for accommodating the tenon-like locating members 40, 41 are totally enclosed thus presenting no entrance or pry point. The toughness and security of the automobile antitheft device so constructed is greatly enhanced.

I claim:

1. An antitheft device for attachment to the steering wheel of an automobile comprising:

a) an elongate tubular member having an elongate passageway extending along its longitudinal axis;

b) a first L-shaped member secured to the tubular member and defining a first hook for engaging a first inner portion of a steering wheel;

c) a housing means including two mating halves, a first half having a major side wall grooved with a first trough which extends longitudinally therethrough and is divided into a semi-circular inner section and an isosceles trapezoidal outer section, a first semi-circular groove extending parallel to the first trough, at least a first transverse groove extending across the first semi-circular groove and intersecting the first trough, a second half having a major side wall grooved with a second trough which extends longitudinally therethrough and is divided into a semi-circular inner section and an isosceles trapezoidal outer section, a second semi-circular groove extending parallel to the second trough, at least a second transverse groove extending across the second semi-circular groove and intersecting the second trough and a boss integrally formed on a sidewall opposite to said major side wall of the second half and formed with a bore extending downwardly through the second half, and fasteners firmly fixing the two mating halves together with the grooved major side walls of the first and second halves adjacent each other to define a passageway including a cylindrical inner section defined between the semi-circular inner sections to receive one end of the tubular member to place the elongate passageway of the tubular member in axial alignment with the passageway of the housing means, a cylindrical compartment defined between the first and second semi-circular grooves and at least one transverse passageway defined between the first and second transverse grooves and extending across the cylindrical compartment and intersecting the passageway;

d) a lock means firmly received in the boss of the second half of the housing means and having a locking member extending downwardly along the axis of the bore of the boss and an actuating pin eccentrically attached to a bottom of the locking member;

e) an elongate actuating member slidably disposed in the cylindrical compartment in the housing means, the actuating member including at least one notch formed therein and defined by a vertical side wall and a sloping side wall and a recess formed in the actuating member, and defined by a stop side wall for engagement by the locking member;

f) a first spring means disposed in the cylindrical compartment for biasing the actuating member;

g) means for securing the lock means to the second half of the housing means, whereby the locking member is rotatable between an unlocked position and a locking position;

h) an elongate rod member provided with a plurality of longitudinally spaced notches and telescopically receivable within the axially aligned passageways of the housing means and the tubular member, and a second L-shaped member secured to the rod member and defining a second hook open in a direction opposite to the first hook for engaging an opposed second inside portion of the steering wheel;

i) a locating member slidably received within the transverse passageway in the housing means, the locating member including an opening sized to receive the actuating member therethrough and positioning the locating member within a notch of the actuating member, and a second spring means disposed in the transverse passageway for urging the locating member towards the passageway of the housing means, whereby when the actuating member is in the locking position, the locating member engages a notch of the rod member, and when the actuating member is in its unlocked position, the locating member is disengaged from the notch of the rod member.

2. An antitheft device as claimed in claim 1 wherein the fasteners including corresponding screw holes extended transversely through the first and second halves of the housing means and screws threaded therein for securing the first and second halves together.

3. An antitheft device as claimed in claim 1 wherein the fasteners further include a bracket member having spaced sidewalls adapted to confine the first and second halves of the housing means in a mating position and rivet pins extending through holes transversely extended through the first and second halves of the housing means for securing the first and second halves together.

* * * * *